United States Patent [19]
Bolton

[11] 4,289,520
[45] Sep. 15, 1981

[54] METHOD AND APPARATUS FOR BENDING GLASS SHEETS

[75] Inventor: Nelson P. Bolton, Quakertown, Pa.

[73] Assignee: Advanced Glass Systems Corporation, Quakertown, Pa.

[21] Appl. No.: 104,324

[22] Filed: Dec. 17, 1979

[51] Int. Cl.³ .............................................. C03B 23/03
[52] U.S. Cl. ...................................... 65/104; 65/106; 65/116; 65/273; 65/287; 65/290
[58] Field of Search ................. 65/104, 106, 273, 287, 65/290, 116

[56] References Cited

U.S. PATENT DOCUMENTS

| 2,215,041 | 9/1940 | Hostetter . | |
| 2,235,969 | 3/1941 | White | 65/273 |
| 2,270,470 | 1/1942 | Paddock . | |
| 2,395,727 | 2/1946 | Devol . | |
| 2,846,819 | 8/1958 | Baker | 65/287 |
| 2,850,844 | 9/1958 | White . | |

FOREIGN PATENT DOCUMENTS

| 1215559 | 11/1959 | France | 65/106 |
| 1209041 | 10/1970 | United Kingdom | 65/106 |

Primary Examiner—Arthur D. Kellogg
Attorney, Agent, or Firm—Steele, Gould & Fried

[57] ABSTRACT

A method for bending glass sheets is provided wherein glass is heated just to the softening point in a molten salt bath, then mechanically forced around a cylindrical or conical form using a forming member which hinges to follow the glass sheet onto the form, thereby maintaining the optical characteristics of the glass sheet by avoiding exertion of force along the plane of the glass sheet.

The apparatus for use with the invention comprises a forming member which maintains contact with the part being formed at the same spot throughout the forming operation, means for supporting the part, and means for actuation.

11 Claims, 4 Drawing Figures

METHOD AND APPARATUS FOR BENDING GLASS SHEETS

BACKGROUND OF THE INVENTION

1. Field of the Invention

This invention relates to the field of forming of glass sheets. The invention is particularly useful in the precision forming of a thin flat glass sheet to a section of a conical or cylindrical shape, while maintaining the optical characteristics of the flat glass sheet in the formed cylindrical or conical section. The invention may be applied to production of faceplates, windshields, goggles and various other items.

2. Description of the Prior Art

Optical applications such as motorcyclists' faceplates require the minimum possible distortion in the finished formed part. If distortion occurs across the field of view, the product is unacceptable for such applications. Moreover, as items made for such optical uses are often laminated to form safety glass, the component glass parts must be made both light in weight and formed to precise dimensions. Unfortunately, thin glass sheets are more susceptible to uneven deformation and distortion during forming than are thicker sheets. Therefore, prior art forming methods have not been completely successful in this area.

The prior art discloses various methods for forming glass sheets to the cylindrical and conical section. These methods may be categorized as two-part molding methods, or stamping processes, and one-part molding methods, or sagging processes. The present invention does not fall strictly into either of these categories. It is intended to employ the advantages and avoid the disadvantages of both processes, and thereby maintain the optical characteristics of the glass sheet while permitting forming to precise dimensions.

Two-part molding processes are those wherein glass sheets are heated until softened, then pressed between male and female molds conforming to the desired shape. A major disadvantage of such stamp molding is that the glass sheet must move relative to the extending portions of the forming member during the forming process. The point of contact between the glass and the forming member must change as the flat glass is brought into the desired curved shape. Resulting force along the plane of the glass sheet causes stretching and rippling of the sheet and degradation of optical characteristics due to variations in the curvature and thickness of the formed piece. In addition, such local variations in curvature make a part less easily laminated with other parts also having varying dimensions.

The present invention avoids exertion of force along the plane of the glass sheet being formed into a cylindrical or conical section, by use of forming wings that maintain contact with the glass sheet at the same point throughout the forming procedure. Thus the glass sheet is not stretched or compressed along its plane and the thickness of the sheet remains more uniform than could be obtained in a similar part made in a stamping process. Rather than forcing the sheet into a curving mold, the present invention bends the sheet around the curving form, by exerting force tangential to the arc followed by the point of contact between the forming member and the glass.

The prior art discloses one-part molding methods wherein the glass sheet is forced into a mold or around a form by a force other than that of another molding member. This force may be provided by gravity or by hot fluid or particle pressure. Such one-part molding methods, or sagging processes, are not subject to the above-described stretching problem, because the glass settles by its own weight into the mold or against the form. However, to produce such sagging, the glass must be heated well into the range of softening, and hence becomes very easily deformed. Variations in curvature of the formed part, and resulting degradations of optical quality also occur because the glass tends to flow in response to the gravity or other pressure exerted upon it.

The present invention allows forming of the glass as soon as the sheet reaches a temperature at which it can be deformed. The relatively low temperature of the sheet and the relatively short time needed to accomplish forming permit the part to be formed and rehardened before unwanted variations in curvature occur and thereby make the part unsuited for use in an optical application, such as an auto windshield or a motorcyclist's faceplate.

In the art of glass forming, heating glass sheets in molten salt baths is well known. The present invention takes advantage of the thermal inertia of such molten salt baths in its forming process. While prior art methods disclose molten salt baths for use at temperatures up to 1,000° or 1,100° F., the present invention is intended to operate at a temperature within a few degrees of the softening temperature of the glass being used, 900° to 1,000° F. Rate of heat transfer is a function of temperature difference. Therefore, as the part being formed approaches the temperature of the bath, the rate of temperature change lessens, and precise temperature control of the glass can be thus accomplished by bath temperature control.

SUMMARY OF THE INVENTION

It is the object of this invention to produce curved glass sheets to a precise radius of curvature without local distortion greater than that present in the initial raw glass sheet prior to bending.

It is also an object of this invention to form curved glass sheets at relatively low temperatures to avoid introduction of unwanted variations in curvature.

It is another object of this invention to form a curved glass sheet by exertion of force perpendicular to the plane of said sheet.

These and other objects are accomplished by a method of bending a flat glass sheet to a conical or cylindricl shape comprising the steps of placing said flat glass sheet against a conical or cylindrical dorm; exerting and maintaining pressure upon said flat glass sheet in a direction tangential to the cycloidal arc followed by an unchanging point of contact between the glass and a forming member; heating said glass sheet to just its softening point, said softening point being detected by deformation of said glass sheet; and, cooling said glass sheet.

The apparatus for use with the above described method comprises a platform; a cylindrical or conical form rigidly mounted on said platform; two or more forming members hingeably mounted upon a post, said post rigidly mounted upon said platform parallel to the axis of said form and displaced therefrom, said forming members curved to a radius of curvature at least as small as that of said cylindrical or conical form; means for exerting a force on said forming members in the direction of said form; and means for immersing and removing said apparatus into and from a vat of molten salt.

DETAILED DESCRIPTION OF A PREFERRED EMBODIMENT

Figure 1:
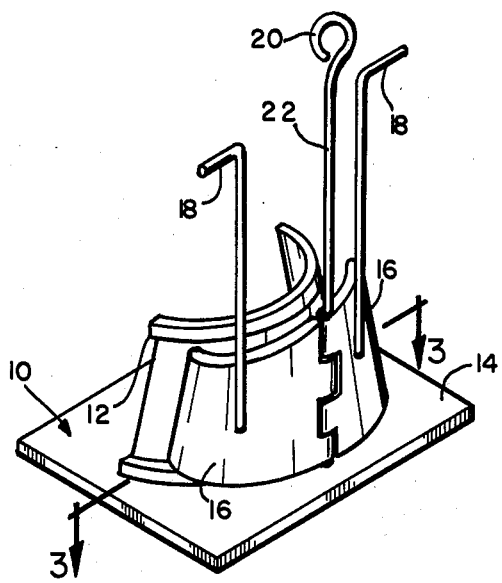
FIG. 1 is a perspective view of the glass supporting and forming apparatus.
Figure 2:
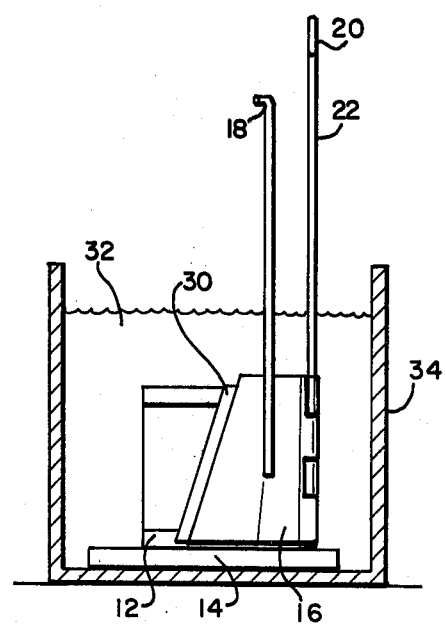
FIG. 2 is a cutaway view of a molten salt bath with the apparatus in place therein.

The forming apparatus 10 of this invention is depicted in FIG. 1. The device is generally supported by a platform 14 upon which are mounted a form 12 and forming members 16, said forming members mounted hingeably on shaft 22. Handles 18 are attached to forming members 16 to allow control of the apparatus by an operator.

In operation, a flat glass sheet is inserted between form 12 and forming members 16. Apparatus 10 is then immersed in a vat 34 containing molten salt 32 maintained at a temperature just above the softening point of the glass, for example, 2° above. Hook 20 on shaft 22 serves as a convenient point of attachment whereby apparatus 10 may be immersed and removed from the vat. Shaft 22 also serves as the pivot point for forming members 16.

Once the apparatus is immersed in the molten salt bath 32, glass sheet 30 begins to heat to its softening point. The operator may exert pressure on handles 18 to detect softening of the sheet, so that bending can be accomplished as soon as possible. When the handles move to the end of their travel, forming is complete. The apparatus is then removed from the salt bath. The glass is then annealed by placing in a salt bath of other heating means at a temperature well below softening as is known in the art.

Alternatively, the invention may be employed advantageously in an automatic manufacturing process. A plurality of forming apparatus 10 may be disposed for automatic loading and immersion. Rather than by operator, softening and forming can be detected by limit switches, and pressure exerted by hydraulic or pneumatic means.

Figure 3:
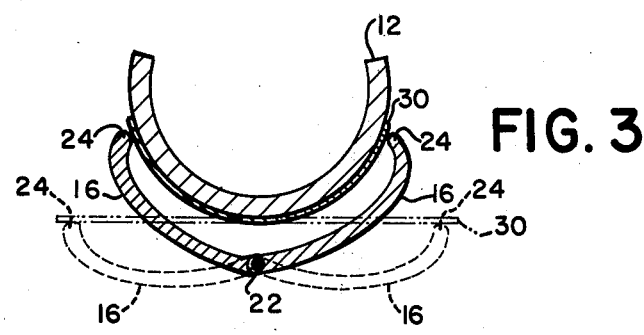
FIG. 3 is a sectional view of the apparatus taken on line 3—3 in FIG. 1, the unformed sheet and open forming apparatus shown in ghost lines.
Figure 4:
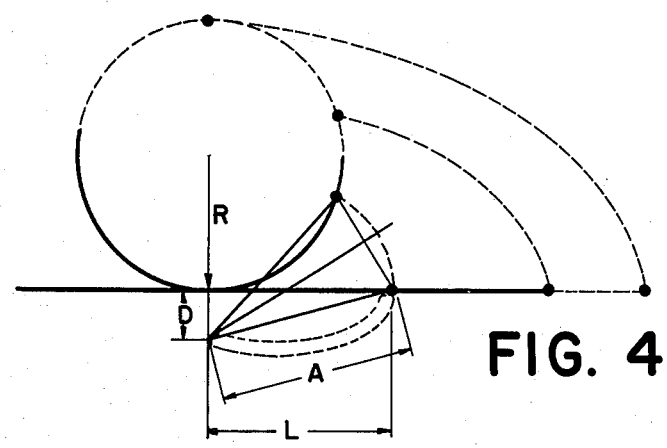
FIG. 4 is a schematic view illustrating the crucial dimensions of the various elements.

As illustrated in FIGS. 3 and 4, the forming members 16 of the apparatus contact glass sheet 30 at the same point through-out forming. Glass sheet 30 begins to bend while its temperature is still low enough to provide some rigidity. Forming at such a relatively low temperature, and exertion of pressure along the proper arc, avoid unnecessary wrinkling or distortion of the finished part.

The glass suitable for use with this invention may be common glass, for example of boro-silicate, aluminum-silicate or soda-lime composition, available from various manufacturers. The glass sheets may be anywhere from 0.010 inches up to 0.500 inches with acceptable results. It will be appreciated, however, that the invention is most valuable when used on thin sheets for laminating and eventual use in an optical application, namely of 0.025–0.100 inches thickness.

Molten salt baths suitable for use include those that become liquid at a temperature below the softening point of the glass, normally in the area of 950 degrees Fahrenheit. The temperature of the bath should be maintained only slightly above said softening point with good results obtained at 3 degrees above softening, within ±2 degrees. Molten salt baths are known in the art, and equipment is readily available to maintain the necessary temperatures. Reference can be made to U.S. Pat. No. 2,146,227—Phillips, for a discussion of chemical compositions useful for heating and chemical strengthening of glass.

The forming members 16 of the invention are disposed such that the points of contact 24 between said forming members and glass sheet 30 do not vary relative to said glass sheet during the bending operation. This is accomplished by proper choice of the length of forming members 16 and spacing between form 12 and rod 22.

Referring to FIG. 4, the proper length and spacing are chosen to match, as closely as possible, the cycloidal arc traced by the point of contact as the sheet is bent around the form. The radius of form 12, denominated "R," is known to the operator, as is the desired angular span desired for the finished part. The operator can calculate the length of glass needed, as a proportion of circumference, said length denominated in FIG. 4 as "L."

$$(L = (\text{angle}/360) \times 2\pi R)$$

The operator then perpendicularly bisects the line between the position of the contact point on the flat glass sheet and the contact point on the cylindrical or conical form. Where this line intersects a vertical line through the center of the form is the proper pivot point. The first point is thereby located equidistant from the position of the contact points at its two extremes of travel, namely on the flat glass sheet and on the form. It will be appreciated that the effect of so locating the pivot point is to approximate the cycloidal arc followed by the contact point on the glass sheet as a circular arc having its center at the pivot point. "D" is thus determined. Now, knowing "D" and "L," the operator calculates "A," the length of the form arms.

$$(A^2 = D^2 + L^2)$$

Using this method, a forming apparatus can be constructed to bend a glass sheet to any desired angular span, even 360°. As pressure is exerted on the glass sheet in a direction tangential to the curve which the sheet follows, forces along the plane of the glass sheet are avoided. Distortion does not occur during forming, and the finished product is as distortion-free as the raw stock.

As depicted in FIG. 4, a longer glass sheet describes a cycloidal arc that, if approximated as a circular arc as disclosed by this invention, is not concentric with the arc described by a shorter glass sheet. Therefore, as a greater angle is desired for the finished part, a longer glass sheet and a greater displacement between form and pivot point are required.

Variations on the embodiments disclosed herein are possible without departure from the inventive concept, and will now be apparent to those skilled in the art. Accordingly, reference should be made to the appended claims rather than the foregoing specification to define the limits of this invention.

I claim:

1. A method of bending glass sheets into cylindrical or conical shapes, comprising the steps of:
   (a) placing said sheet to be bent against a form conforming to the desired curvature;
   (b) heating said sheet to its softening point; (c) exerting a force on at least two contact points on said sheet in a direction tangential to curves followed by said at least two contact points as said sheet is deformed, said force being exerted, and said at least two contact points being substantially unchanged with respect to said sheet, as said sheet is bent to conform to said form; and,
   (d) cooling said sheet to a point below its softening point.

2. The method of bending glass sheets of claim 1, wherein said heating step is performed by immersing said sheet in a molten salt bath, said bath heated to at least said softening point of said sheet.

3. The method of bending glass sheets of claim 2, further comprising annealing said sheet by immersion in a second molten salt bath maintained at a temperature below said softening point.

4. An apparatus for bending a glass sheet into a desired cylindrical or conical shape, comprising:
   (a) a form rigidly mounted on a platform, said form having an axis, and said form conforming to said desired shape;
   (b) a shaft rigidly mounted on said platform by a first end, said shaft disposed parallel to said axis of said form;
   (c) two or more forming members having contact portions thereon and hingeably disposed on said shaft, said shaft displaced from said form at a distance such that contact between said forming portions and said glass sheet remains substantially unchanged with respect to the glass sheet as the glass is bent into the desired shape;
   (d) means for exerting a force on said forming members against said glass sheet; and,
   (e) means for heating said glass sheet.

5. The apparatus for bending a glass sheet of claim 4, wherein said shaft is displaced from said form to a point equidistant from said contact point on said form and from said contact point on said glass sheet before forming, whereby said force is exerted in said tangential direction and said contact point remains substantially unchanged during forming.

6. The apparatus for bending a glass sheet of claim 5, wherein said means for heating comprises a molten salt bath in which said glass sheet is immersed during bending.

7. The apparatus for bending a glass sheet of claim 6, wherein said means for exerting a pressure on said forming members comprises handles rigidly attached to said forming members, said handles being long enough to extend out of said molten salt bath.

8. The apparatus for bending a glass sheet of claim 7, further comprising a hook at a second end of said shaft, said shaft being long enough to extend out of said molten salt bath.

9. The apparatus of claim 4 wherein said arc is substantially a cycloidal arc, whereby said force is at all times normal to a plane defined by said glass sheet.

10. The apparatus of claim 4, wherein two forming members are hingeably disposed on said shaft.

11. An apparatus for bending a glass sheet into a desired cylindrical or conical shape, comprising:
    (a) a form conforming to the desired shape;
    (b) means for supporting said sheet against the form;
    (c) means for holding said sheet by contact with a first portion of said sheet;
    (d) means for exerting force against at least one forming member having at least one forming portion for contact against a second portion of said glass sheet; and,
    (e) means for maintaining contact between said at least one forming portion and said glass sheet substantially unchanged with respect to said glass sheet during forming.

* * * * *